Aug. 5, 1952 S. A. SCHERBATSKOY 2,606,295
HIGH-EFFICIENCY IONIZATION CHAMBER
Filed July 14, 1948 2 SHEETS—SHEET 1

INVENTOR.
SERGE A. SCHERBATSKOY
BY
James Y. Cleveland
ATTORNEY

Aug. 5, 1952

S. A. SCHERBATSKOY 2,606,295

HIGH-EFFICIENCY IONIZATION CHAMBER

Filed July 14, 1948

INVENTOR.
SERGE A. SCHERBATSKOY

BY *James H. Cleveland*

ATTORNEY

Patented Aug. 5, 1952

2,606,295

UNITED STATES PATENT OFFICE 2,606,295

HIGH-EFFICIENCY IONIZATION CHAMBER

Serge A. Scherbatskoy, Tulsa, Okla., assignor to Well Surveys, Incorporated, a corporation of Delaware Application July 14, 1948, Serial No. 38,639

3 Claims. (Cl. 250—83.6)

The present invention relates to an improvement in radiation measuring devices of the ionization chamber type.

An important object of this invention is to provide a measuring device of a much higher efficiency than the conventional ionization chamber. Another object is to provide such a device as will be sufficiently rugged in comparatively rough service such as in logging of wells and bore holes.

The conventional ionization chambers often consist of a thin-walled tubular metallic cathode and of an elongated anode member coinciding with the axis of the cathode tube. The anode and the cathode are enclosed in an envelope containing suitable gaseous medium usually at a superatmospheric pressure. The detection of gamma rays by means of such an instrument is based upon an indirect process involving extraction of ionizing electrons. That is, the detector is not directly responsive to the passage of gamma rays but is made to be responsive only if gamma rays liberate ionizing electrons either through the interaction with the gaseous medium within the detector or through the interaction with the cylindrical wall of the detector. The liberated electrons are drawn to the positive anode colliding with the gas molecules in its path and thus liberating further electrons.

In an ionization chamber, the total number of electrons liberated by the collision depends upon the energy of the initial electrons extracted by the incoming photons. A suitable voltage applied across the electrodes creates within the gaseous medium an electrostatic field that collects the products of ionization and causes a current to flow through the output circuit of the ionization chamber. This current represents the energy of all the initial ionizing electrons liberated per second by the incoming photons and, therefore, it can be used as a measure of the ionizing effectiveness or strength of the radiation.

In an ideal ionization chamber, the interaction of the incoming radiation with matter is complete, i. e., each photon extracts from the cathode wall or from the gas one ionizing electron. Consequently, the total ionization produced in the gas can be made to be substantially representative of the total energy of the incoming gamma radiation. In practice, however, only a very small percentage of photons intercepted by the ionization chamber actually produce ejected electrons. Consequently, the efficiency of the measuring instrument is small. The purpose of the present invention consists in increasing the probability of interaction of the incoming photons or other particles with matter.

Therefore, the principal object of this invention is to provide a method and apparatus for measuring radiation resulting from nuclear disintegrations. The measurement is based upon the process of interaction of said radiation with matter and the efficiency of such an interaction is arranged to be considerably greater than in the devices of the prior art.

Other objects and advantages of the present invention will become apparent from the following detailed description when considered with the drawings, in which Figure 1 is a schematic illustration of a vertical section of an ionization chamber as contemplated by the present invention;

Figure 1:
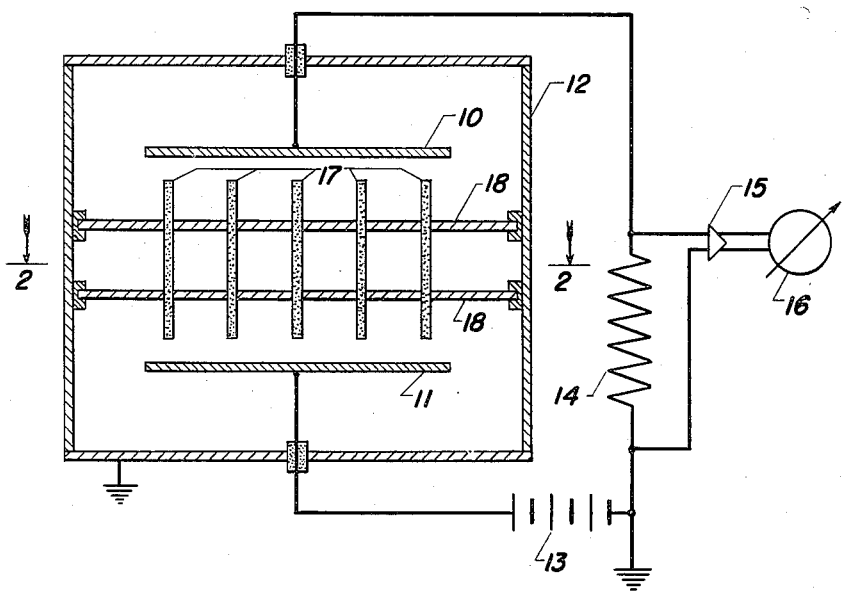
Figure 2:
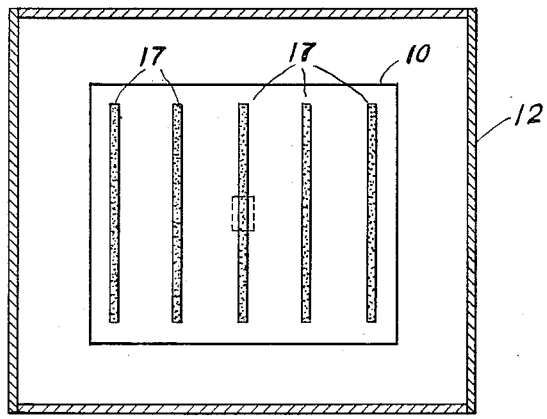
Figure 2 is a cross-sectional view of the ionization chamber.

Referring now more particularly to the enclosed drawings, particularly Figures 1 and 2, there is shown an ionization chamber employing insulating solid structure placed in the gaseous medium in order to increase the number of ionizing electrons that result from the interaction of the incoming radiations and matter. The ionization chamber illustrated in the drawing contains many components that are also present in an ionization chamber of standard type, such as two electrodes in a form of parallel metallic plates 10 and 11 suitably distant one from the other within a housing 12 containing an ionizable medium such as argon, at a pressure of about 100 atmosphere. Instead of argon, any other gas having similar characteristics or mixture of such gases may be used. A battery 13 and a fixed resistor 14 are connected in series with the electrodes of the ionization chamber, the battery preferably supplying about 150 volts of direct current potential and the resistor having a resistance of about $10^{12}$ ohms. The terminals of the resistor 14 are connected to an amplifier 15 which in turn is connected to a meter 16 for indicating the intensity of radiation. The voltage between the electrodes 10 and 11 creates within the container 12 an electrostatic field having line of force perpendicular to the electrode plates 10 and 11.

The space between the electrodes 10 and 11 is partly occupied by a plurality of parallel thin plates 17 parallel to the direction of the lines of force. The plates 17 are of insulating material and may be a phenolic condensation product such as that sold under the trade-mark "Bakelite." The structure comprising the plates 17 does not therefore disturb appreciably the electrostatic field created by the difference of potential applied between the electrodes 10 and 11 and has an effect of increasing the efficiency of the ionization chamber by providing additional contribution in the number of electrons extracted from the insulating plates 17 by the stream of gamma rays. These additional ionizing electrons increase the efficiency of the ionization chamber and consequently the measurement performed by means of the meter 16 is subject to an error that is smaller than in conventional ionization chambers.

Consequently, the novel feature of the present ionization chamber consists in providing in the space between the electrodes a solid insulating structure comprising plates aligned along the direction of the lines of force. It is apparent that the insertion of the plates 17 between the electrodes 10 and 11 does not alter substantially the distribution of the electrostatic field which remains aligned in the direction of the arrow $a$. The presence of the insulating plates 17 increases, however, the effective surface exposed to gamma rays. In a standard ionization chamber the incoming radiations extract ionizing electrons mainly from the internal surface of the metallic plates 10 and 11 and the electrostatic field is effective to collect ionization products caused by said electrons. In the ionization chamber of the present invention, however, the incoming gamma rays extract electrons not only from the plates 10 and 11 but also from the surfaces of the plate members 17 and thus produce a larger amount of ionization in the gaseous medium due to the additional number of ionizing electrons extracted from the plates 17. Consequently, the efficiency of the ionization chamber is considerably larger than the one of the standard type. The products of ionization resulting from the collision of the extracted electrons with gaseous medium are collected as in a standard ionization chamber by means of an electrostatic collecting field and cause a current to flow in the output circuit through the resistor 14. The voltage across the resistor 14 produced by this current is amplified in 15 and subsequently indicated on the meter 16. This voltage provides an index of the intensity of the gamma radiations.

The purpose of the insulating structure is to increase the interaction of the incoming gamma rays and matter. Thus the plates 17 act primarily as electron-emitting surfaces and, because of their insulating properties, they do not modify substantially the electrostatic collecting field caused by the voltage impressed between the electrodes 10 and 11.

Figure 3:
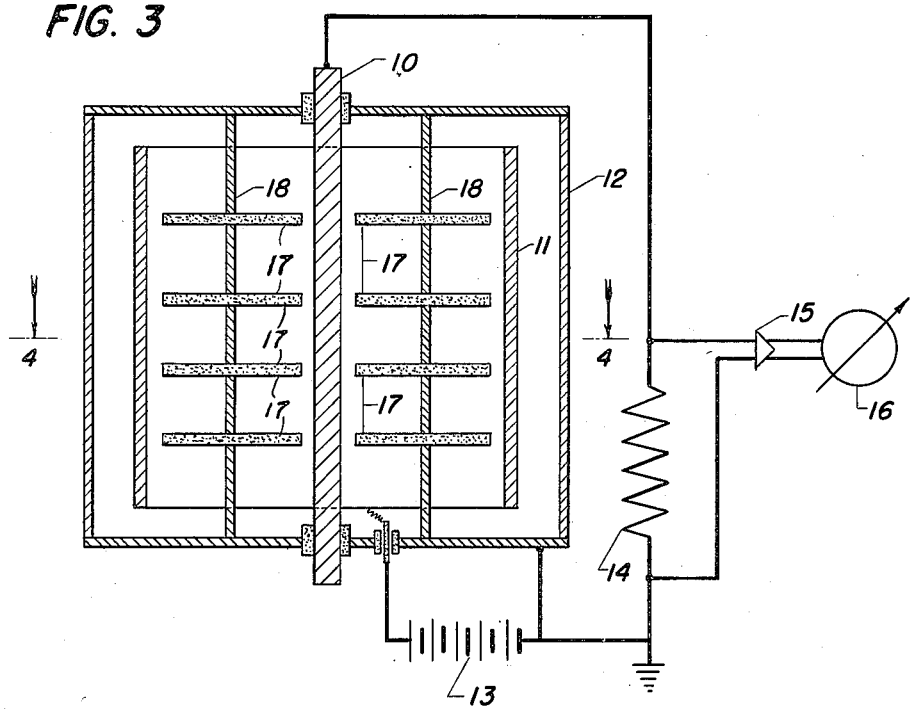
Figure 3 is a modified form of ionization chamber showing a somewhat different arrangement of the internal elements.
Figure 4:
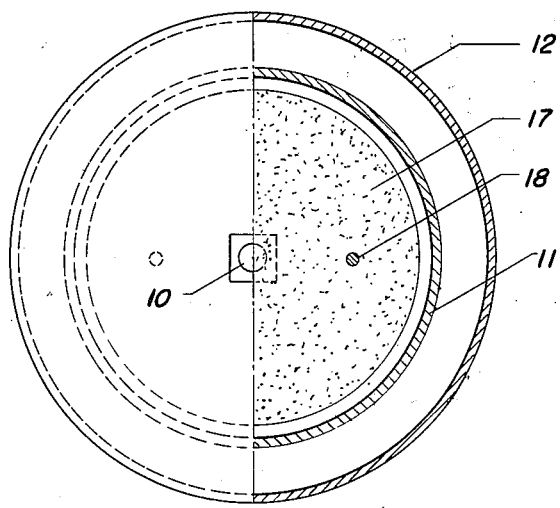
Figure 4 is a cross-sectional view of the ionization chamber illustrated in Figure 3 and taken along the line 4—4 of Figure 3.

In Figures 3 and 4 there is illustrated a modified form of the ionization chamber as contemplated by the present invention. This form of the ionization chamber differs from that illustrated in Figures 1 and 2 only in the arrangement of the internal elements 10, 11, 17 and 18. As in Figure 1, the rods 18 are also of insulating material and serve to hold the plates 17 in parallel spaced relationship.

Although the present invention finds broad application wherever it is desired to measure penetrating radiation, such as gamma rays, it is particularly adapted for use in well surveying.

I claim:

1. A radiation detector for detecting radiations resulting from nuclear disintegrations comprising two electrodes, means for producing an electrostatic field in the space between said electrodes, and parallel insulating plates occupying a portion of said space and aligned along the direction of the lines of force of said electrostatic field and means for supporting the plates out of contact with the electrodes.

2. A detector for detecting radiation resulting from nuclear disintegration comprising a pair of elongated, parallel uniformly spaced apart electrodes in a gas medium in which one of said electrodes is a cathode and the other is an anode, and parallel electrically insulating plates immersed in said medium for emitting electrons under the influence of said radiation, said electrons ionizing said gas medium, means for supporting said plates out of contact with said electrodes and an ionization responsive circuit connected between said electrodes.

3. A detector for detecting radiation resulting from nuclear disintegrations comprising a closed container, two electrodes suitably spaced one from the other and adapted to emit ionizing electrons as a result of interaction with said radiation and ionizable gas within the container, means for producing an electrostatic field between said electrodes for collecting at said electrodes products of ionization of said gas by said electrons, and a solid structure of a suitable geometrical shape, within said container for emitting additional ionizing electrons as a result of interaction with said radiation, said structure being non-conductive in order not to disturb the collecting field between said electrodes, means for supporting said plates out of contact with said electrodes and means for measuring the collected products of ionization as an index of said radiation.

SERGE A. SCHERBATSKOY.

REFERENCES CITED

The following references are of record in the file of this patent:

UNITED STATES PATENTS

| Number | Name | Date |
|---|---|---|
| 2,486,944 | Hare | Nov. 1, 1949 |
| 2,493,346 | Herzog | Jan. 3, 1950 |

FOREIGN PATENTS

| Number | Country | Date |
|---|---|---|
| 690,411 | Germany | Apr. 24, 1940 |

OTHER REFERENCES

Preston, U. S. Atomic Energy Commission, A. E. C. D. 1954, October 7, 1947, 5 pages.